(12) United States Patent
Komori

(10) Patent No.: US 6,563,842 B1
(45) Date of Patent: May 13, 2003

(54) COMMUNICATIONS SYSTEM

(75) Inventor: Yoshiyuki Komori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/141,739

(22) Filed: Aug. 27, 1998

(30) Foreign Application Priority Data

Mar. 19, 1998 (JP) .......................................... 10-069953

(51) Int. Cl.⁷ ................................................ H04J 3/04
(52) U.S. Cl. ........................ 370/535; 370/536; 370/537
(58) Field of Search ................................ 370/537, 359, 370/396, 398, 356, 442, 532, 533, 535, 536, 299, 357, 360, 376, 419, 420, 421, 422, 423, 437, 485, 498, 539, 540, 541, 542

(56) References Cited

U.S. PATENT DOCUMENTS

| | | | |
|---|---|---|---|
| 5,228,030 A | * 7/1993 | Dresher | 370/464 |
| 5,436,899 A | * 7/1995 | Fujino et al. | 370/433 |
| 5,483,592 A | * 1/1996 | Ishioka et al. | 379/373.01 |
| 5,499,241 A | * 3/1996 | Thompson et al. | 370/486 |
| 6,097,817 A | * 8/2000 | Bilgic et al. | 380/270 |

* cited by examiner

*Primary Examiner*—Douglas Olms
*Assistant Examiner*—Phirin Sam
(74) *Attorney, Agent, or Firm*—Katten Muchin Zavis Rosenman

(57) ABSTRACT

A transmission device on the side of subscriber terminals that have been divided into groups multiplexes, on a per-group basis, signals from the subscriber terminals, further time-division multiplexes the multiplexed data in each group and sends the time-division multiplexed data to a transmission device on the side of an exchange switch. The transmission device on the subscriber side senses the traffic states (on-hook/off-hook states) of the subscriber terminals and sends a signal indicative of the sensed states to the transmission device on the switch side. The latter (1) demultiplexes high-speed time-division multiplexed data, which is sent from each transmission device on the subscriber side, to time-division multiplexed data on a per-group basis; (2) identifies, based upon traffic state information, a group in which a subscriber terminal in the off-hook state resides; (3) connects a time-division multiplexed data sending line corresponding to this group to an unused channel unit; and (4) inputs the time-division multiplexed data to the switch via this channel unit.

5 Claims, 11 Drawing Sheets

FIG.3

| SUBSCRIBER NO. | ON/OFF HOOK |
|---|---|
| 11 | 0 or 1 |
| 12 | 0 or 1 |
| 13 | 0 or 1 |
| 14 | 0 or 1 |
| ⋮ | ⋮ |
| nn | 0 or 1 |

"1" WHEN OFF HOOK
"0" WHEN ON HOOK

COMMUNICATIONS SYSTEM

BACKGROUND OF THE INVENTION

This invention relates to a communications system and, more particularly, to a communications system in which a plurality of transmission devices provided on the subscriber side and a single transmission device provided on the side of a switch are connected by high-speed digital transmission lines and subscriber terminals are connected to the transmission devices on the subscriber side, whereby the subscriber terminals are accommodated by the switch.

In currently existing subscriber-based optical transmission systems, the configuration is such that a plurality of COT transmission devices (COT is the abbreviation of "Central Office Terminal") are provided on the side of a switch, a plurality of RT transmission devices (RT is the abbreviation of "Remote Terminal") are provided on the subscriber side and each COT transmission device and its corresponding RT transmission device are connected by a single high-speed digital transmission line (e.g., a high-speed optical transmission line). The RT transmission devices are deployed at remote locations, such as in office buildings, towns and villages.

FIG. 10 is a block diagram illustrating the configuration of a subscriber-based optical transmission system according to the prior art. The system includes an exchange 1 having a switch 2 and COT transmission devices 3A–3N, ordinary household telephones or public telephones 4A–4N provided at remote locations, RT transmission devices 5A–5N provided at remote locations and optical transmission lines 6A–6N for connecting the COT transmission devices 6 and corresponding RT transmission devices.

The RT transmission devices 5A–5N respectively include subscriber circuits $7_1$–$7_n$ connected to corresponding telephones, CODECs (coder/decoders) $8_1$–$8_n$ for converting analog signals, which enter from the subscriber circuits, to digital signals and converting digital signals, which enter from the side of the transmission lines, to analog signals, channel units $9_1$–$9_n$ for performing a unipolar/bipolar conversion and for inserting and extracting various control data, a multiplexer/demultiplexer 10 for multiplexing digital signals, which enter from the CODECs via the channel units, and sending the multiplexed signals to the side of the optical transmission lines, and for demultiplexing multiplexed data, which enters from the side of the optical transmission lines, and outputting the demultiplexed signals to prescribed channels units, and optical terminal equipment 11 for converting electric signals to optical signals and sending the optical signals to the optical transmission lines 6A–6N, and for converting optical signals, which enter from the optical transmission lines, to electric signals and outputting the electric signals.

The COT transmission devices 3A–3N respectively include channel units $12_1$–$12_n$ for performing a unipolar/bipolar conversion and for inserting and extracting various control data, a multiplexer/demultiplexer 13 for multiplexing digital signals, which enter from the switch 2 via the channel units, and sending the multiplexed signals to the side of the optical transmission lines, and for demultiplexing multiplexed data, which enters from the side of the optical transmission lines, and outputting the demultiplexed signals to the switch, and optical terminal equipment 14 for converting electric signals, which enter from the multiplexer/demultiplexer, to optical signals and sending the optical signals to the optical transmission lines 6A–6N, and for converting optical signals, which enter from the optical transmission lines 6A–6N, to electric signals and outputting the electric signals.

FIG. 11 is a block diagram illustrating the detailed construction of an RT transmission device.

Remote telephones 4A with which the RT transmission device 5A is provided are divided into n groups of m telephones each. The m telephones $4_{11}$–$4_{1m}$ of a first group are connected to subscriber circuits $7_{11}$–$7_{1m}$ of a first group and the subscriber circuits $7_{11}$–$7_{1m}$ are in turn connected to CODECs $8_{11}$–$8_{1m}$. The CODECs $8_{11}$–$8_{1m}$ convert voice signals, which enter from the telephones $4_{11}$–$4_{1m}$, to 64-Kbps digital signals and input the digital signals to the multiplexer/demultiplexer 10 via channel devices $9_{11}$–$9_{1m}$. The multiplexer/demultiplexers 10 of the respective groups concentrate and time-division multiplex (m≦32) 64-Kbps digital signals of a maximum of 32 channels, which have entered via the m channel units $9_{11}$–$9_{1m}$, and output the multiplexed signals on signal lines $L_1$–$L_n$ as 2-Mbps digital signals. A multiplexer/demultiplexer 10' further multiplexes the 2-Mbps time-division multiplexed data, which enters from the multiplexer/demultiplexers 10 of the 1st–nth groups via the signal lines $L_1$–$L_n$, to 34-Mbps or 150-Mbps data (assumed here to be 34-Mbps data) and outputs the data to the optical transmission line 6A from the optical transmission unit 11.

Further, 34-Mbps time-division multiplexed data, which has entered from the switch 2 via the optical transmission line 6A and optical transmission unit 11, is demultiplexed to 2-Mbps time-division multiplexed data by the multiplexer/demultiplexer 10', and this data enters the multiplexer/demultiplexers 10 of the 1st–nth groups. The multiplexer/demultiplexer 10 of each group converts the 2-Mbps time-division multiplexed data to 64-Kbps digital data of a maximum of 32 channels and inputs the digital signals to prescribed CODECs via the channel devices. Each CODEC to which a digital signal has been input converts the digital signal to an analog signal and inputs the analog signal to a telephone.

FIG. 12 is a block diagram showing the construction of the exchange. The COT transmission devices 3A–3N are provided to correspond to the remote RT transmission devices 5A–5N and are connected to the RT transmission devices 5A–5N via the optical transmission lines 6A–6N. Further, the COT transmission devices 3A–3N are connected to the switch 2 via n-number of the 2-Mbps signal lines $L_1$–$L_n$. The 34-Mbps time-division multiplexed data sent from the RT transmission devices 5A–5N enter the COT transmission devices 3A–3N via the optical transmission lines 6A–6N. The optical transmission unit 14 in each of the COT transmission devices 3A–3N converts the optical signal to an electric signal and inputs the electric signal to the multiplexer/demultiplexer 13. The latter demultiplexes the 34-Mbps time-division multiplexed data to 2-Mbps digital signals and inputs the demultiplexed signals to the switch 2 via the channel units $12_1$–$12_n$ and signal lines $L_1$–$L_n$. The multiplexer/demultiplexers 13 of the respective COT transmission devices 3A–3N multiplex the 2-Mbps digital signals, which have entered from the switch 2 via the signal lines $L_1$–$L_n$ and channel units $12_1$–$12_n$, to 34-Mbps data and send the data to the optical transmission lines 6A–6N from the optical transmission units 14.

In accordance with this subscriber-based optical transmission system, (1) the RT transmission devices 5A–5N correspond to the COT transmission devices 3A–3N within the exchange 1, and (2) the 2-Mbps time-division multiplexed data on the signal lines $L_1-L_n$ (FIG. 11) within the RT transmission device 5A matches the 2-Mbps time-division multiplexed data on the signal lines $L_1-L_n$ (FIG. 12) within the exchange 1. Similarly, the 2-Mbps time-division multiplexed data on the signal lines $L_1-L_n$ within the RT transmission devices 5B–5N matches the 2-Mbps time-division multiplexed data on the signal lines $L_1-L_n$ connected to the COT transmission devices 3B–3N within the exchange 1.

As a result, regardless of the fact that the COT transmission devices 3A–3N on the switch side and the RT transmission device 5A–5N at the remote areas are connected by the single optical transmission lines 6A–6N, the arrangement is functionally equivalent to connecting the signal lines $L_1-L_n$ of the 2-Mbps time-division multiplexed data of each group of each RT transmission device directly to the switch 2. This is advantageous in that the cost of laying optical cable can be reduced.

Thus, in the conventional subscriber-based optical transmission system, the COT transmission devices are provided within the exchange so as to correspond to the RT transmission devices, and each COT transmission device requires, in addition to optical terminal equipment and a multiplexer/demultiplexer, channel units the number (n) of which is the same as the number of groups within the corresponding RT transmission device. When the amount of traffic of each subscriber telephone is large, the number of subscriber telephones constituting a group decreases and the number n of groups increases so that the number of channel units constituting the COT transmission device increases accordingly.

The periods of time subscriber telephones are used in remote areas such as business districts and residential areas differ. That is, telephone use at night is greater in residential areas, while telephone use during the day is greater in business districts. Consequently, when RT transmission devices are provided in business districts and residential areas and connected to the same exchange, the total amount of telephone use does not vary that much by period of time. Nevertheless, the conventional arrangement is such that each COT transmission device is required to be provided with hardware (a number of channel units) that anticipates the maximum traffic in each remote area.

The problem that arises is an increase in the quantity, size and cost of the exchange hardware.

SUMMARY OF THE INVENTION

Accordingly, an object of the present invention is to reduce the number of channel units in an exchange, thereby making it possible to reduce the size and lower the cost of the exchange.

Another object of the present invention is to reduce the number of channel units by sharing the channel units provided in an exchange with each of the RT transmission device connected to the exchange.

A further object of the present invention is to statistically measure the temporal transition of traffic in advance and share channels units, which are provided in an exchange, with the RT transmission devices based upon the previously measured traffic, thereby reducing the number of channel units.

The maximum amount of traffic of individual transmission devices on the subscriber side does not occur at the same timing. That is, traffic peaks at different timings. The present invention takes note of this fact and decides the hardware of the transmission device on the side of the switch in such a manner that congestion will not occur, even when traffic peaks. This makes it possible to reduce the amount of hardware (e.g., the number of channel units) necessary.

More specifically, a transmission device on the subscriber side converts analog signals from subscriber terminals to digital signals to multiplex the digital signals group by group, time-division multiplexes the multiplexed data from each group and sends the data to the transmission device on the switch side. Further, the transmission device on the subscriber side senses the traffic state (e.g., on-hook/off-hook state) of each subscriber telephone and sends the sensed state to the transmission device on the switch side. The transmission device on the switch side (1) demultiplexes high-speed time-division multiplexed data, which is sent from each transmission device on the subscriber side, to time-division multiplexed data on a per-group basis; (2) identifies, based upon traffic state information, a group in which a subscriber terminal in the off-hook state (communicating state) resides; (3) connects only a time-division multiplexed data sending line corresponding to this group to an unused channel unit; and (4) inputs the time-division multiplexed data to the switch via this channel unit. If this arrangement is adopted, the transmission device on the switch side does not require that time-division multiplexed data sending lines of a group in which all subscriber terminals are in the on-hook state be connected to a channel unit. As a result, the number of channel units provided in an exchange can be reduced, thereby making it possible to reduce the size and lower the cost of the exchange.

Further, the transmission device on the switch side statistically obtains the temporal transition of traffic through each transmission device on the subscriber side in advance, decides the number of channel units allocated to the transmission devices on the subscriber side at each point in time based upon the amount of traffic undergoing a transition with time, and, on the basis of the number of channel units decided, performs control to connect channel units and lines which send time-division multiplexed data, on a per-group basis, sent from each of the transmission devices on the subscriber side. If this arrangement is adopted, the number of channel units provided in an exchange can be reduced, thereby making it possible to reduce the size and lower the cost of the exchange.

Other features and advantages of the present invention will be apparent from the following description taken in conjunction with the accompanying drawings.

BRIEF DESCRIPTION OF THE DRAWINGS

FIG. 3 shows an example of stored off-hook/on-hook states;

DESCRIPTION OF THE PREFERRED EMBODIMENTS

Figure 1:
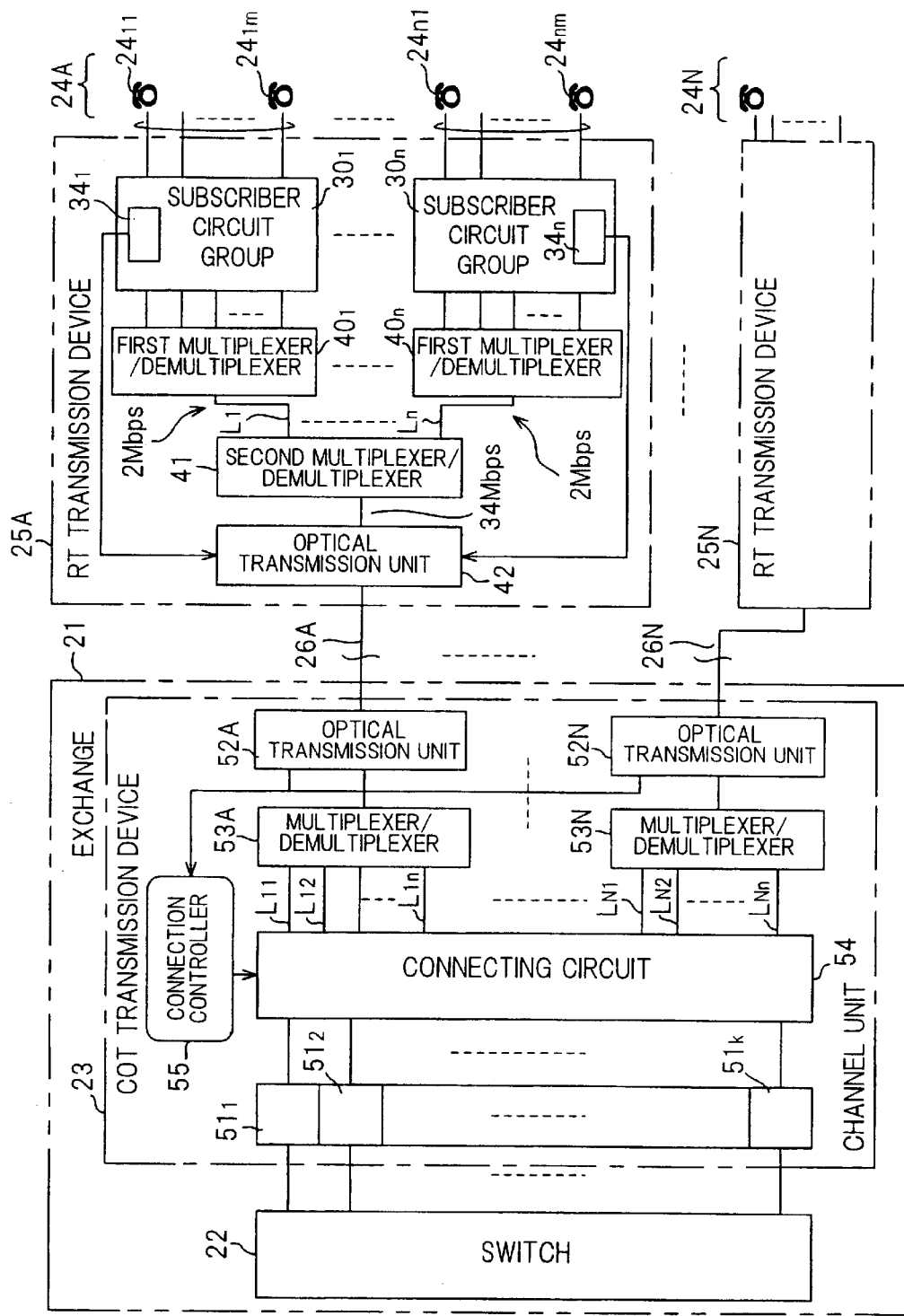
FIG. 1 is a block diagram showing the configuration of a subscriber-based optical transmission system according to the present invention.

(A) Configuration of Subscriber-based Optical Transmission System According to this Invention FIG. 1 is a block diagram showing the configuration of a subscriber-based optical transmission system according to the present invention. The system includes an exchange 21 having a switch 22 and one COT transmission device 23, ordinary household telephones or public telephones 24A–24N provided at remote locations, identically constructed RT transmission devices 25A–25N provided at remote locations and optical transmission lines 26A–26N for connecting the COT transmission device 23, which is provided in the exchange, and each of the RT transmission devices 25A–25N.

The RT transmission device 25A, which is a transmission device on the subscriber side, includes subscriber circuit groups $30_1$–$3_n$, first multiplexer/demultiplexers $401$–$40n$, a second multiplexer/demultiplexer 41 and an optical transmission unit 42 for converting electric signals to optical signals and optical signals to electric signals. Remote telephones 24A with which the RT transmission device 25A is provided are divided into n groups of m telephones each, by way of example. The m telephones $24_{11}$–$24_{1m}$ of a first group are connected to the first subscriber circuit group $30_1$, ..., and the m telephones $24_{n1}$–$24_{nm}$ of an nth group are connected to the nth subscriber circuit group $30_n$. The subscriber circuit groups $30_1$–$30_n$ each have m channels of subscriber circuits, CODECs and channel units (none of which are shown) for the respective telephones, with the channel units being connected to the first multiplexer/demultiplexers $40_1$–$40_n$. The subscriber circuit groups $30_1$–$30_n$ are provided with hook-state storing and sending units $34_1$–$34_n$, respectively, for storing the on-hook/off-hook states of the telephones and sending the states to the exchange 21.

The first multiplexer/demultiplexers $40_1$–$40_n$ concentrate and time-division multiplex (m≦32) 64-Kbps digital signals of a maximum of 32 currently communicating channels among the m channels and output the multiplexed signals on the signal lines $L_1$–$L_n$ as 2-Mbps digital signals. The second multiplexer/demultiplexer 41 further multiplexes the 2-Mbps time-division multiplexed data, which enters from the first multiplexer/demultiplexers $40_1$–$40_n$ of the respective groups via the signal lines $L_1$–$L_n$, to, e.g., 34-Mbps or 150-Mbps data (assumed here to be 34Mbps data) and outputs the data to the optical transmission line 26A from the optical transmission unit 42. It should be noted that the optical transmission unit 42 inserts information, which indicates the on-hook/off-hook states of the telephones entering from the hook-state storing and sending units $34_1$–$34_n$, into a suitable location at the beginning of a frame, such as in the frame header, and then sends the information.

Further, 34-Mbps time-division multiplexed data, which has entered from the exchange 21 via the optical transmission line 26A and optical transmission unit 42, is demultiplexed to 2-Mbps time-division multiplexed data by the second multiplexer/demultiplexer 41, and this data enters the first multiplexer/demultiplexers $40_1$–$40_n$ of the respective groups. The first multiplexer/demultiplexers $40_1$–$40_n$ of the respective groups convert the 2-Mbps time-division multiplexed data to 64-Kbps digital signals of a maximum of 32 channels and input the digital signals to the subscriber circuit groups $30_1$–$30_n$. As a result, the digital signals enter the CODECs via prescribed channel units, whereby the digital signals are converted to analog signals, the latter entering the telephones via the subscriber circuits.

The COT transmission device 23, which is a transmission device on the switch side, includes k channel units $51_1$–$51_k$ for performing a unipolar/bipolar conversion and for inserting and extracting various control data. If N represents the number of RT transmission devices 25A–25N connected to the exchange 21, n the number of groups in each RT transmission device and k the number of channel units in the exchange 21, then the arrangement is such that k<N·n holds. In other words, the number k of channel units is less than the total number of groups N·n.

The COT transmission device 23 further includes optical transmission units $52_A$–$52_N$, which are connected to the transmission lines 26A–26N, respectively, for converting optical signals to electric signals and electric signals to optical signals, and multiplexer/demultiplexers $53_A$–$53_N$ for demultiplexing 34-Mbps high-speed time-division multiplexed data, which is sent from the RT transmission devices 25A–25N, to 2-Mbps time-division multiplexed data for each group, sending the demultiplexed data to the lines $L_{11}$–$L_{1n}$, ..., $L_{N1}$–$L_{Nn}$, and multiplexing 2-Mbps time-division multiplexed data that enters from the switch side to 34-Mbps high-speed time-division multiplexed data. The 2-Mbps time-division multiplexed data of each group on the output lines $L_{11}$–$L_{1n}$ of the multiplexer/demultiplexer $53_A$ matches the 2-Mbps time-division multiplexed data of each group sent from the first multiplexer/de-multiplexers $40_1$–$40_n$ in the RT transmission device 25A to the output lines $L_1$–$L_n$. Accordingly, if none of the telephones of the first group, for example, are currently communicating, a digital signal will not be output on output line $L_{11}$. Similarly, if none of the telephones of the 2nd to nth groups are currently communicating, digital signals will not be output on output lines $L_{11}$–$L_{1n}$.

The COT transmission device further includes a connecting circuit 54 for connecting, to unused channel units among the channel units $51_1$–$51_k$, those lines among the N×n lines $L_{11}$–$L_{Nn}$ that actually send 2-Mbps time-division multiplexed data demultiplexed by the multiplexer/demultiplexers $53_A$–$53_N$. A connection controller 55 controls the connecting circuit 54 based upon telephone hook-state information sent from the RT transmission devices 25A–25N so as to connect the lines $L_1$–$L_{1n}$, ... $L_{N1}$–$L_{Nn}$ corresponding to groups in which subscriber terminals in the off-hook state reside to unused channel units $51_1$–$51_k$.

The hook-state information indicating the on-hook/off-hook state of the telephones constituting each of the groups is transmitted from the RT transmission device 25A–25N, whereby the information enters the connection controller 55. The connection controller 55 determines, group by group, whether a subscriber terminal in the off-hook state exists, connects, to unused channel units, lines among the N×n lines $L_{11}$–$L_{Nn}$ that correspond to groups in which subscriber terminals in the off-hook state reside, and changes the unused channel units to in-use channel units. As a result, 2-Mbps time-division multiplexed data of a group to which a subscriber terminal in the off-hook state belongs enters the switch 22 via the connecting circuit 54 and channel units. If the connection controller 55 has connected prescribed lines $L_{11}$–$L_n$ and channel units, the connection controller 55 maintains the connection until all telephones of groups corresponding to these lines attain the on-hook state. When all telephones have attained the on-hook state, the connection controller 55 cancels the connection and restores the disconnected channel units to unused channel units.

(B) RT Transmission Device

Figure 2:
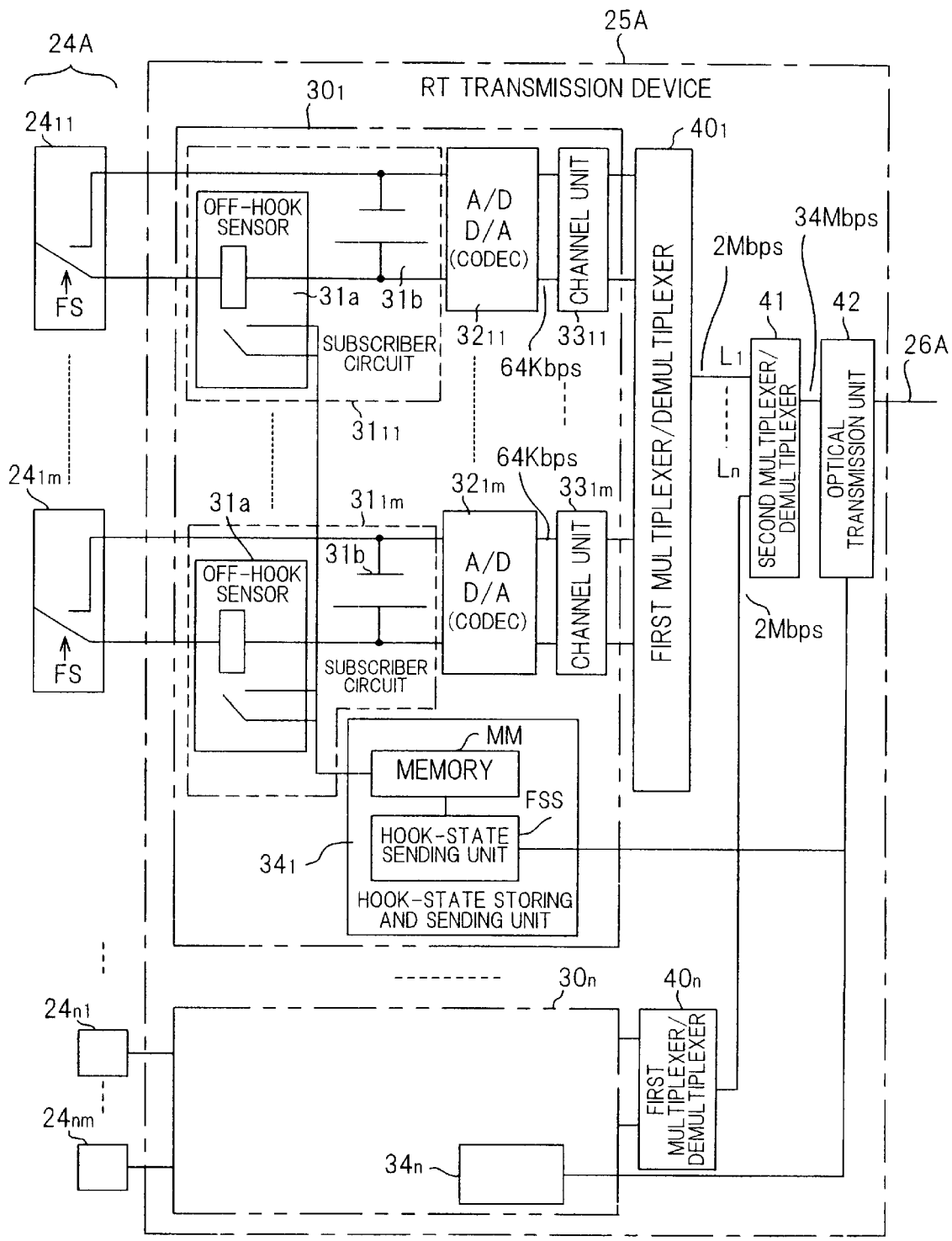
FIG. 2 is a block diagram showing the construction of an RT transmission device.

FIG. 2 is a block diagram showing the construction of an RT transmission device. Components identical with those shown in FIG. 1 are designated by like reference characters. This diagram differs from that of FIG. 1 in that the construction of the subscriber circuit group $30_1$ is shown in detail. The subscriber circuit group $30_1$ includes subscriber circuits $31_{11}$–$31_{1m}$, provided to correspond to the telephones $24_{11}$–$24_{1m}$, that function to supply the telephones $24_{11}$–$24_{1m}$ with communication current and to sense the on-hook/off-hook states of the telephones. Each subscriber circuit includes an off-hook sensor 31a constituted by a relay senses whether a hook switch FS is on or off, and a channel current supply unit 31b. CODECs $3211$–$32m$ convert voice signals, which enter from the telephones, to 64-Kbps digital signals and input the digital signals, and convert 64-Kbps digital signals, which enter from the side of the optical transmission lines, to analog signals. Channel units $33_{11}$–$33_{1m}$ for perform a unipolar/bipolar conversion and for insert and extract various control data. The CODECs $32_{11}$–$32_{1m}$ convert voice signals, which enter from the telephones $24_{11} 24_{1m}$, to 64-Kbps digital signals and input the digital signals to the first multiplexer/demultiplexer $40_1$ via the channel units $33_{11}$–$33_{1m}$. Further, the CODECs $32_1$–$32_m$ convert digital signals, which have entered from the first multiplexer/demultiplexer $40_1$ via channel units, and input the digital signals to the telephones via the subscriber circuits.

The hook-state storing and sending units $34_1$–$34_n$, which are provided for respective groups, have a memory MM for storing the on-hook/off-hook state of each telephone, and a hook-state sending unit FSS for sending the on-hook/off-hook states of the telephones to the COT transmission device of the exchange 21. FIG. 3 shows an example of hook states stored in the memory MM. Hook switch states, i.e., on/off ("1": off-hook; "0": on-hook), are stored in correspondence with subscriber numbers (telephone numbers). The hook-state sending unit FSS sends the on/off state of the hook switches of the telephones to the exchange as hook-state information.

(C) COT Transmission Device

Figure 4:
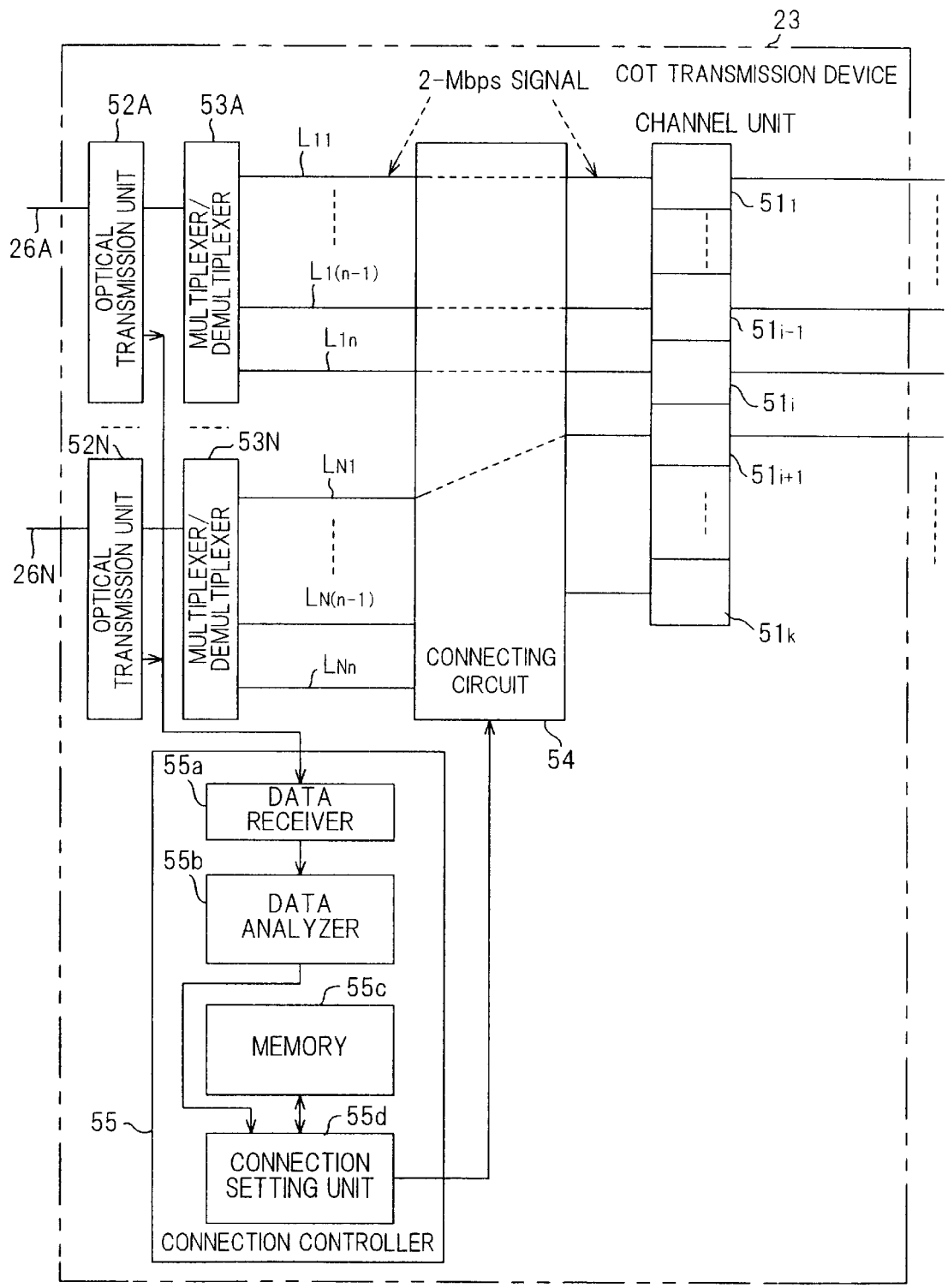
FIG. 4 is a block diagram showing the construction of a COT transmission device.

FIG. 4 is a block diagram showing the construction of a COT transmission device. Components identical with those shown in FIG. 1 are designated by like reference characters. This diagram differs from that of FIG. 1 in that the construction of the connection controller 55 is shown in detail.

The connection controller 55 includes a data receiver 55a for receiving the hook-state information of the telephones in each group sent from the RT transmission devices 25A–25N, a data analyzer 55b for analyzing whether the telephones constituting the groups include telephones in the off-hook state, and a memory 55c for storing a matrix which indicates the state of the connections between the channel units $51_1$–$51_k$ and the output lines $L_{11}$–$L_{1n}$, . . . , $L_{N1}$–$L_{Nn}$ that send the 2-Mbps time-division multiplexed data of each group.

Figure 5:
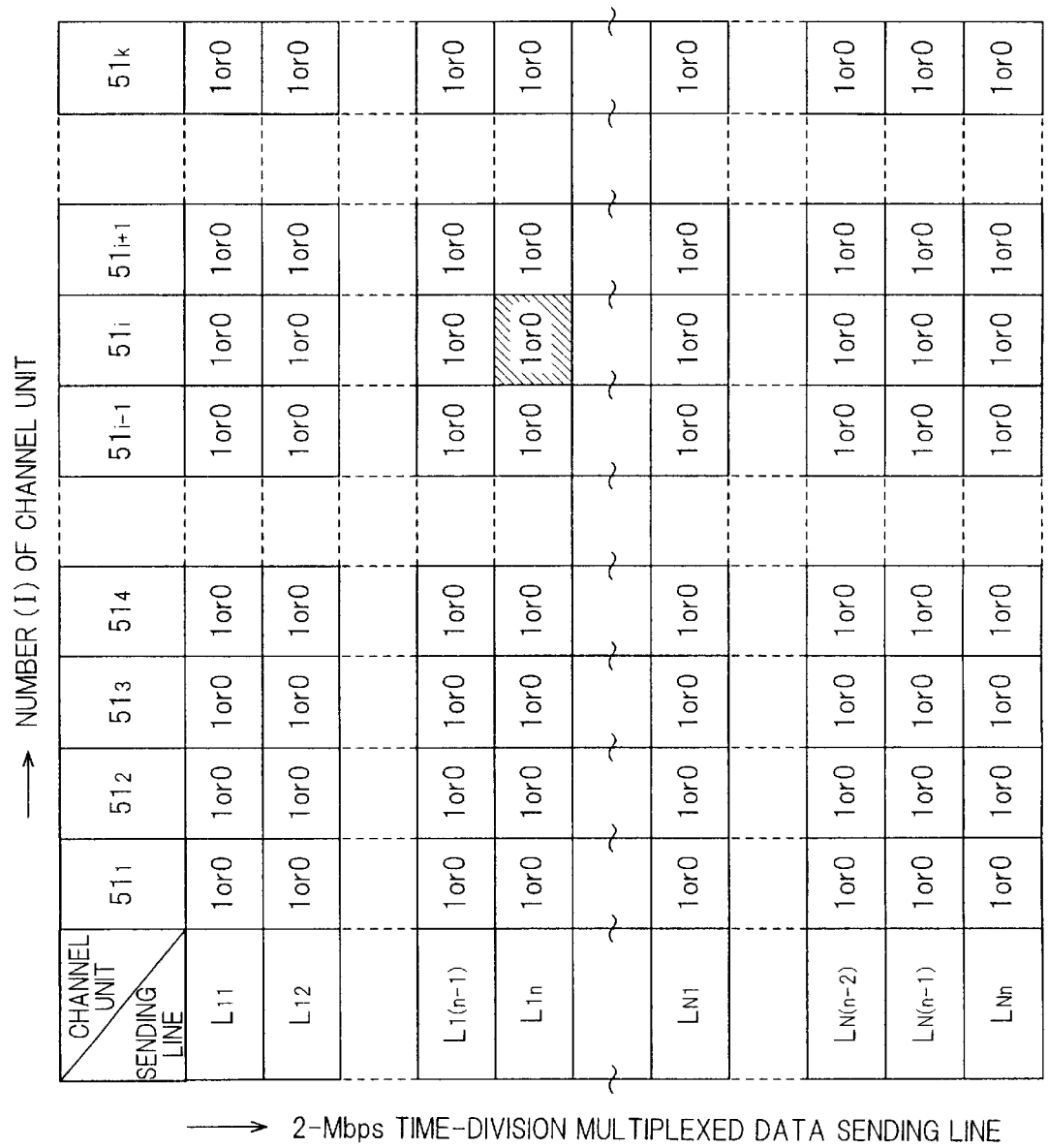
FIG. 5 is a diagram useful in describing the states of connection between 2-Mbps time-division multiplexed data sending lines and channel units.

FIG. 5 is a diagram useful in describing the matrix. The lines $L_{11}$–$L_{1n}$, . . . $L_{N1}$–$L_{Nn}$ that send the 2-Mbps time-division multiplexed data are taken in the vertical direction and the channel units $51_1$–$51_k$ are taken in the horizontal direction. If the line $L_{1n}$ has been connected to the channel unit $51_i$, then a "1" is stored at the matrix cross point. In other words, if a line and a channel unit have been connected to each other, then a "1" is stored at the cross point in the matrix; if they have not been connected together, then a "0" is stored at the cross point. Accordingly, the column of a channel unit not being used will be all "0" s. In a case where the telephones constituting a group are all in the on-hook state, the horizontal row of an output line corresponding to this group will be all "0" s.

With reference again to FIG. 4, the connection controller 55 further includes a connection designating unit 55d for controlling the connecting circuit 54 based upon the on-hook/off-hook states of the telephones of each group and the matrix stored in the memory 55c, thereby designating the connections between prescribed 2-Mbps time-division multiplexed data sending lines $L_{11}$–$L_{11n}$, . . . , $L_{N1}$–$L_{Nn}$ and channel units $51_1$–$51_k$.

Figure 6:
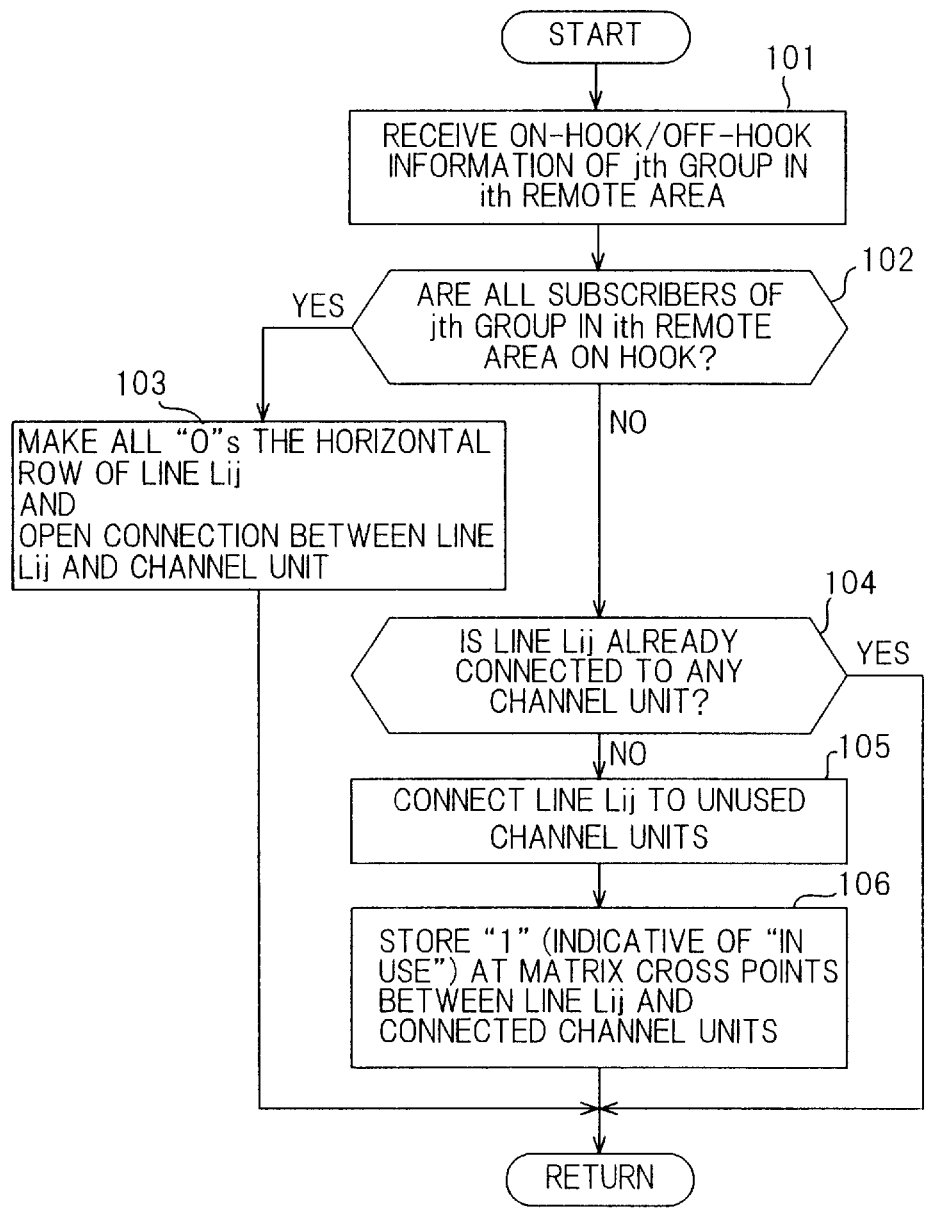
FIG. 6 is a flowchart of connection processing according to the present invention.

FIG. 6 is a flowchart of connection processing performed by the connection controller 55.

Upon receiving on-hook/off-hook information of a jth group in an ith remote location (a jth group in an ith RT transmission device) (step 101), the connection controller 55 determines whether the telephones of the jth group in the ith remote area are all in the on-hook state (step 102). If all telephones of the jth group in the ith remote area are in the on-hook state, the connection controller 55 makes all "0" s the horizontal row of the output line $L_{ij}$ in the matrix and controls the connecting circuit 54 to open the connection between the output line $L_{ij}$ and any channel unit (step 103).

However, if it is found at step 102 that not all of the telephones are in the on-hook state, i.e., that there is a telephone in the off-hook state, then the connection controller 55 determines whether the output line $L_{ij}$ is already connected to any channel unit (step 104) and, if it is, terminates processing.

On the other hand, if the output line $L_{ij}$ is not connected to any channel unit, the connection controller 55 obtains an unused channel unit from the matrix and controls the connecting circuit 54 to connect the output line $L_{ij}$ to this channel unit (step 105).

Next, the connection controller 55 writes a "1" at the matrix cross point between the output line $L_{ij}$ and the connected channel unit (step 106). The connection controller 55 then repeats the above-described processing.

(D) Alternative Construction of COT Transmission Device

In the above-described COT transmission device, the connections between the 2-Mbps time-division multiplexed data sending lines $L_{11}$–$L_{1n}$, . . . , $L_{N1}$–$L_{Nn}$ and channel units are controlled in real-time based upon the on-hook/off-hook states of the telephones in each of the groups. However, it is possible to adopt an arrangement in which the temporal transition of amount of traffic over certain time periods (every hour, every day or every month) is measured in advance, the number of channels allocated to the RT transmission devices 25A–25N at each point in time is decided based upon the amount of traffic undergoing this temporal transition, and the connections between the 2-Mbps time-division multiplexed data sending lines $L_{11}$–$L_{1n}$, . . . , $L_{N1}$–$L_{Nn}$ and channel units 511–51k are controlled based upon the number of channel units decided.

Figure 7:
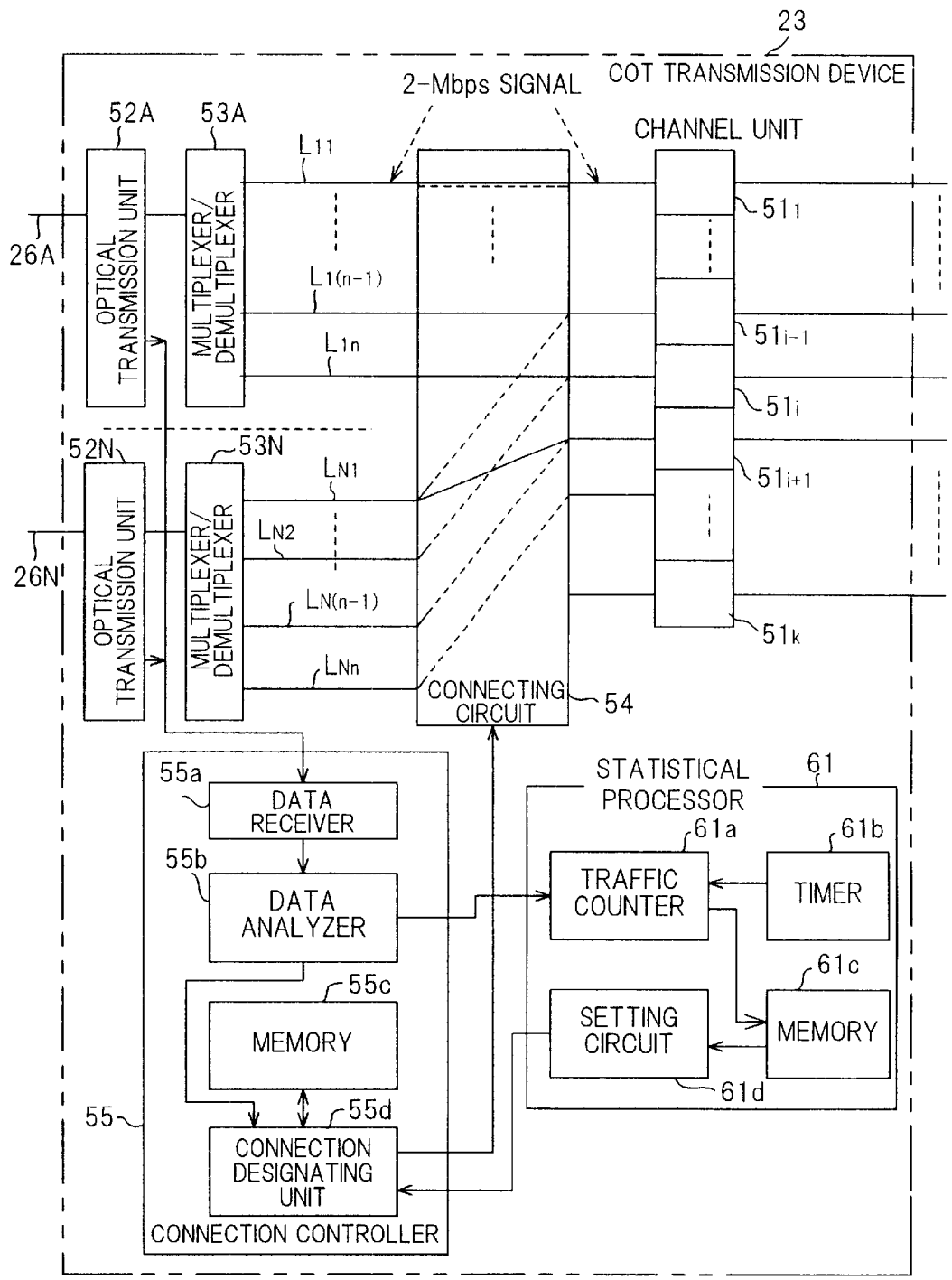
FIG. 7 is a block diagram showing another construction of a COT transmission device.

FIG. 7 is a block diagram showing the construction of the COT transmission device in such case. Components identical with those shown in FIG. 1 are designated by like reference characters. As shown in FIG. 7, the COT transmission device 23 includes a statistical processor 61 for calculating amount of traffic over certain time periods (every hour, every day or every month) is measured in advance and deciding, based upon the amount of traffic that changes with time, the number of channel units allocated to the RT transmission devices 25A–25N at each point in time. The statistical processor 61 includes a traffic counter 61a, a timer 61b, a memory 61c and a setting unit 61d.

Figure 8:
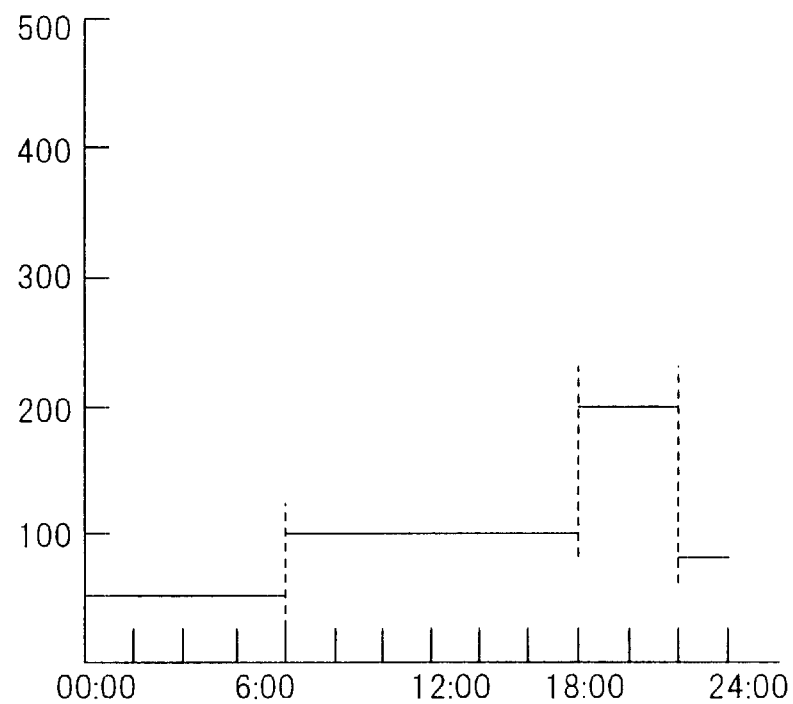
FIG. 8 is a graph showing average traffic of an RT transmission device 25A every hour.
Figure 9:
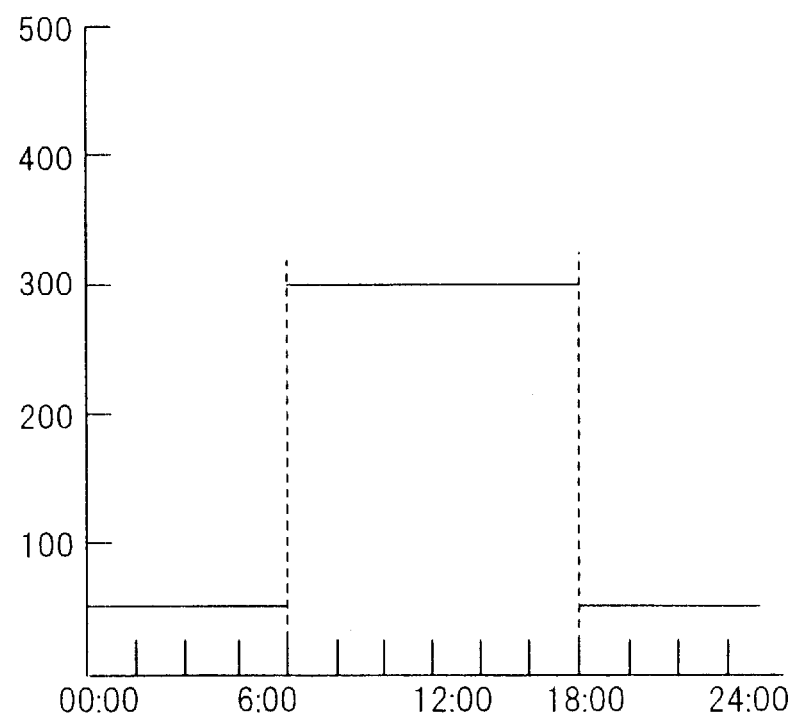
FIG. 9 is a graph showing average traffic of an RT transmission device 25N every hour.
Figure 10:
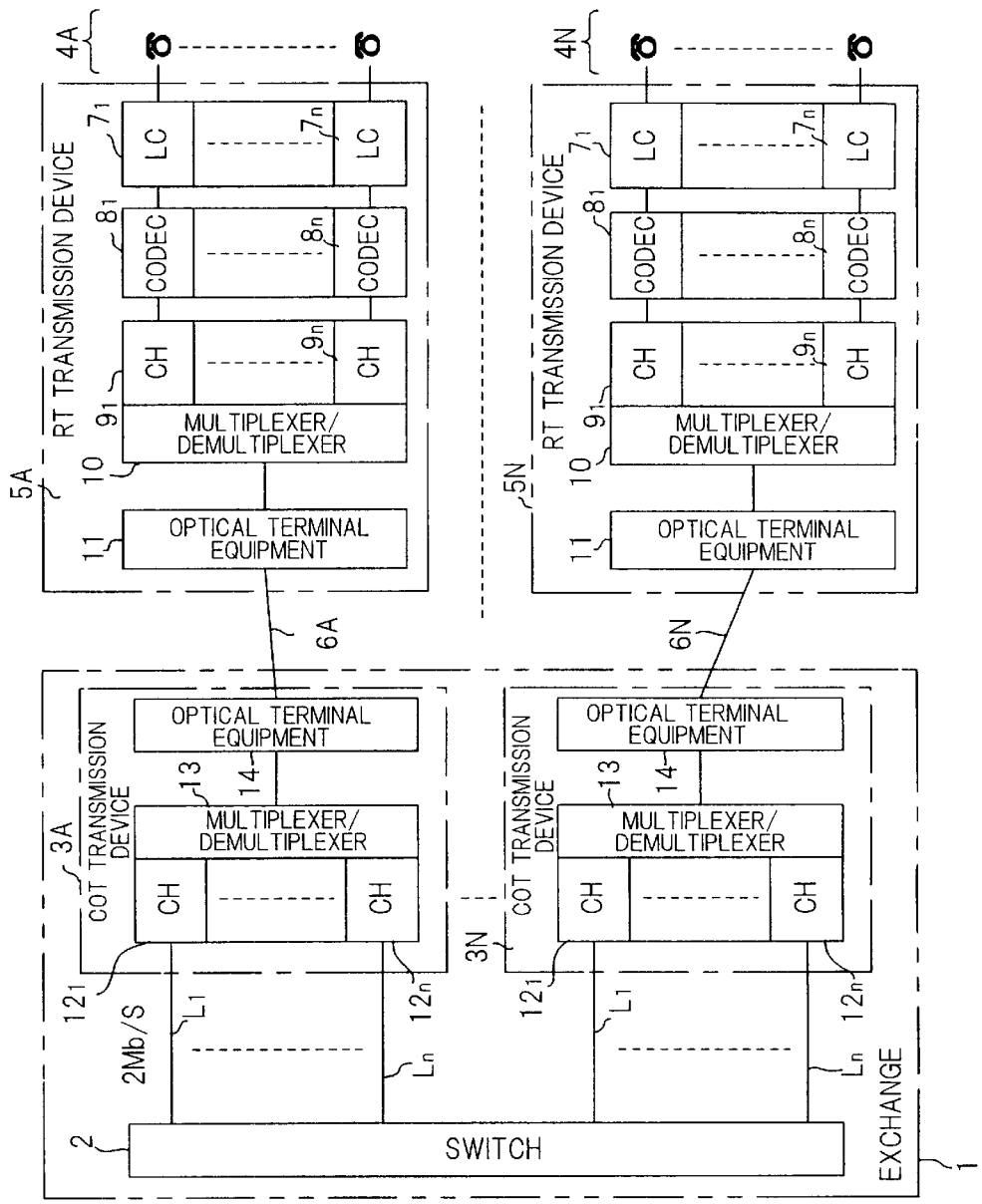
FIG. 10 is a block diagram illustrating the configuration of a subscriber-based optical transmission system according to the prior art.
Figure 11:
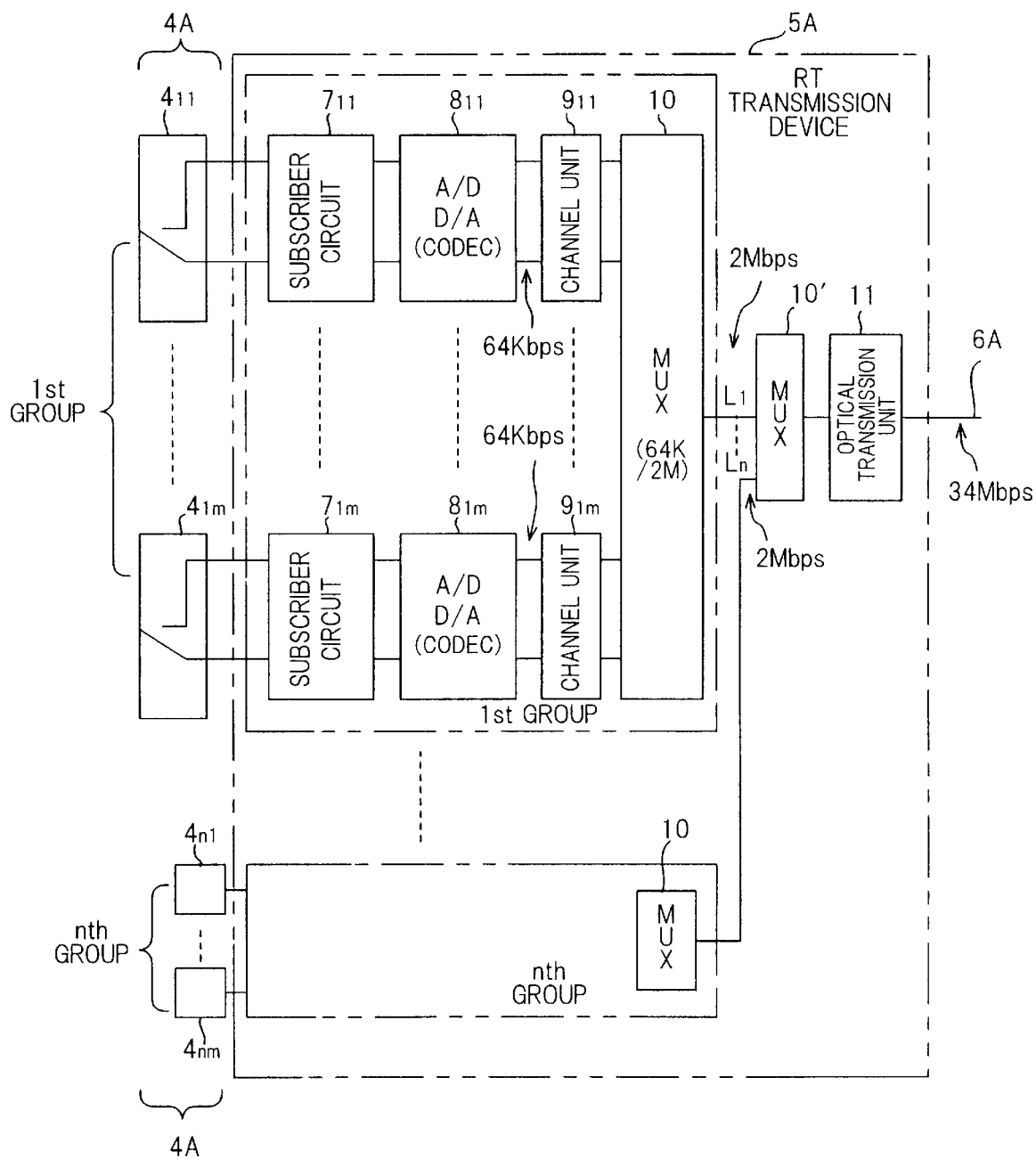
FIG. 11 is a block diagram illustrating an RT transmission device according to the prior art.
Figure 12:
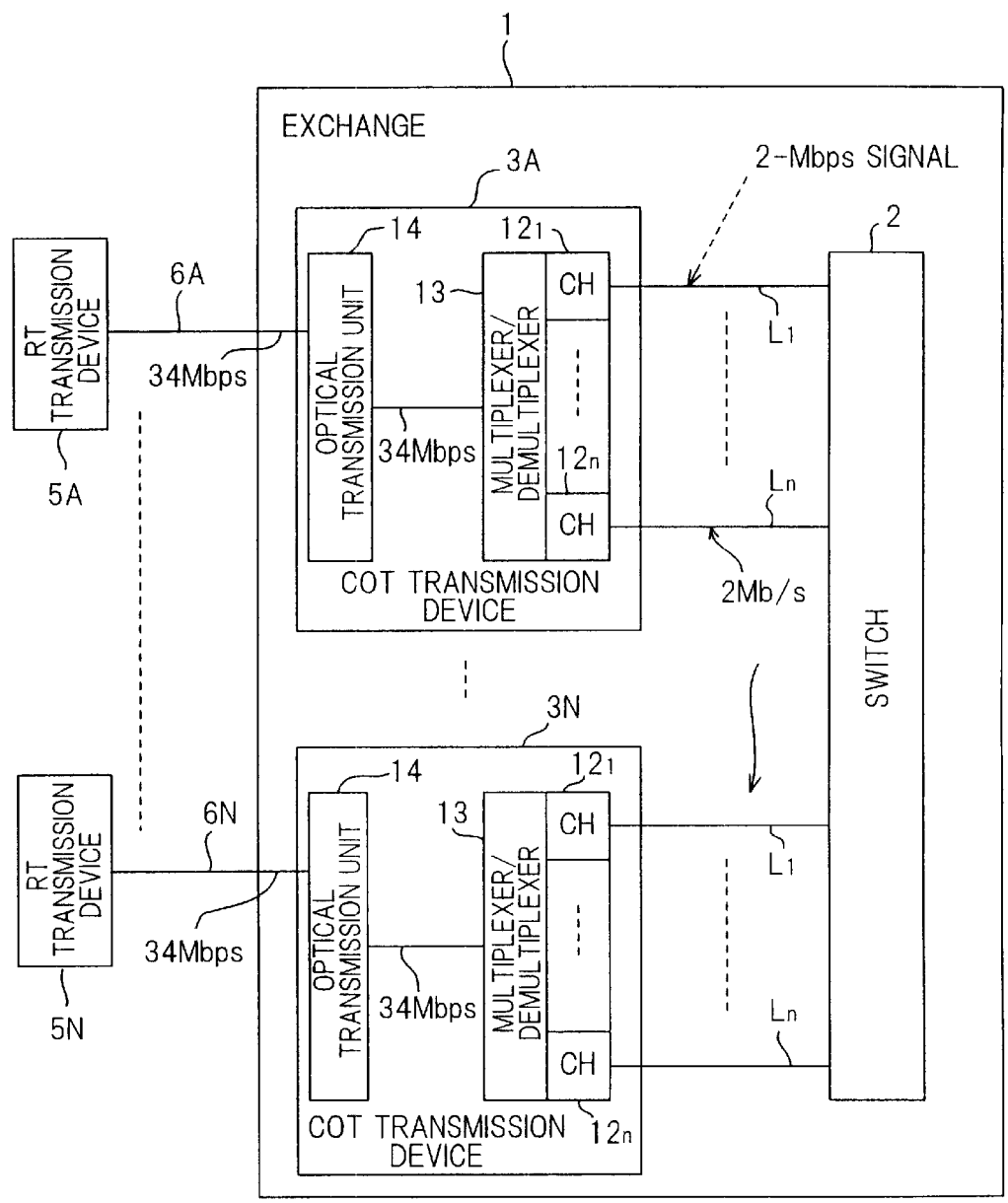
FIG. 12 is a block diagram showing the construction of an exchange according to the prior art.

On the basis of the signal, output by the data analyzer 55b, indicating the number of off-hook telephones in each group, the traffic counter 61a calculates the amount of traffic associated with each RT transmission device (the amount of telephoning by subscribers belonging to an RT transmission device installed at a certain remote area) over a certain period (one day, for example) and stores the result in the memory 61c. FIG. 8 is a graph showing average traffic every hour on one day associated with subscribers connected to the RT transmission device 25A installed at a residential area, and FIG. 9 is a graph showing average traffic every hour on one day associated with subscribers connected to the RT transmission device 25N installed in a business district. These graphs show that the time periods during which the telephone lines are utilized differ, with telephone utilization time in the residential area being greater from the evening onward, when families are at home. The business district makes greater use of telephones during the daytime.

This means that the number of channel units allocated to the RT transmission device 25A can be reduced during the daytime, the number of channel units allocated to the RT transmission device 25N can be reduced in the evening and the number of channel units allocated to both can be reduced late at night. Accordingly, the setting unit 61d decides the number of channel units allocated to the RT transmission device 25A–25N at each point in time on the basis of the temporal transition of one day of traffic stored in the memory 61c and instructs the connection controller 55 to connect the 2-Mbps time-division multiplexed data sending lines $L_{11}$–$L_{1n}$, . . . , $L_{N1}$–$L_{Nn}$ and channel units 51₁–51k. In response, the connection controller 55 controls the connecting circuit 54 so as to connect the 2-Mbps time-division multiplexed data sending lines and channel units.

For example, if the RT transmission device 25A requires n of the 2-Mbps signals and the RT transmission device 25N requires one 2-Mbps signal, then the lines $L_{111}$–$L_{1Nn}$, . . . , $L_{N1}$–$L_{Nn}$ and channel units 51₁–51k are connected as indicated by the solid lines in FIG. 7. Then, if the RT transmission device 25A comes to require one 2-Mbps signal and the RT transmission device 25N comes to require n of the 2-Mbps signals upon elapse of a certain period of time from the state indicated by the solid lines, the lines $L_{11}$–$L_{1n}$, . . . , $L_{N1}$–$L_{Nn}$ and channel units 51₁–51k will be connected as indicated by the dashed lines in FIG. 7.

Thus, the single COT transmission device 23 is provided for the N-number of RT transmission devices 25A–25N, and the channel units of this COT transmission device constitute hardware shared by the RT transmission devices.

Though a case has been described in which optical transmission lines are used as the transmission lines, the present invention is not limited to use of optical transmission lines.

Thus, according to the present invention, a transmission device on the subscriber side multiplexes digital signals on a per-group basis, further time-division multiplexes the multiplexed data from each group and sends the resulting data to a transmission device on the switch side. The transmission device on the switch side (1) demultiplexes high-speed time-division multiplexed data, which is sent from each transmission device on the subscriber side, to time-division multiplexed data on a per-group basis; (2) identifies, based upon traffic state information sent from each transmission device on the subscriber side, a group in which a subscriber terminal in the off-hook state resides; (3) connects a time-division multiplexed data sending line corresponding to this group to an unused channel unit; and (4) inputs the time-division multiplexed data to the switch via this channel unit. As a result, the number of channel units provided in an exchange can be reduced, thereby making it possible to reduce the size and lower the cost of the communications system and exchange.

Further, in accordance with the present invention, the transmission device on the switch side statistically obtains the temporal transition of traffic through each transmission device on the subscriber side in advance, decides the number of channel units allocated to the transmission devices on the subscriber side at each point in time based upon the transition in traffic, and, on the basis of the number of channel units decided, performs connection control to connect channel units and lines which send time-division multiplexed data, on a per-group basis, sent from each of the transmission devices on the subscriber side. As a result, the number of channel units provided in an exchange can be reduced, thereby making it possible to reduce the size and lower the cost of the communications system and exchange.

As many apparently widely different embodiments of the present invention can be made without departing from the spirit and scope thereof, it is to be understood that the invention is not limited to the specific embodiments thereof except as defined in the appended claims.

What is claimed is:

1. A communications system comprising:
    subscriber-side transmission devices, each provided in a remote area, for converting analog signals from subscriber terminals divided into a plurality of groups to digital signals, time-division multiplexing the digital signals on a per-group basis to obtain time-division multiplex data having a first bit rate, further time-division multiplexing the time-division multiplexed data of each group to obtain time-division multiplexed data having a second bit rate, and sending the time-division multiplexed data having the second bit rate,
    a switch-side transmission device for demultiplexing the time-division multiplexed data of the second bit rate sent from each subscriber-side transmission device to time-division multiplexed data of the first bit rate of each respective group, and inputting the time-division multiplexed data of the first bit rate to a switch via channel units; and
    digital signal transmission lines for connecting each of the subscriber-side transmission devices to the switch-side transmission device;
    said subscriber-side transmission device having means for sensing a traffic state of each group and sending a signal indicative of the traffic state of each group sensed; and
    said switch-side transmission device including:
        channel units for inputting the time-division multiplexed data of the first bit rate the number of the channel units of for inputting the time-division multiplexed data of the first bit rate being smaller than a total number of groups;

demultiplexing means for demultiplexing the time-division multiplexed data of the second bit rate sent from each subscriber-side transmission device to time-division multiplex data of the first bit rate of each respective group;

a connecting circuit for connecting, to a prescribed channel unit, a respective line which sends the demultiplexed time-division multiplexed data of the first bit rate; and a connection controller for controlling the connecting circuit, based upon traffic information sent from the subscriber-side transmission devices, to connect, to an unused channel unit, each line which sends the demultiplexed time-division multiplexed data of the first bit rate in a group to which a subscriber terminal in an off-hook state belongs.

2. The system according to claim 1, wherein the traffic state is one of a on-hook state and an off-hook state of each subscriber terminal, and said connection controller discriminates off-hook states of the subscriber terminals in each group and connects, to the unused channel unit, the line which sends demultiplexed time-division multiplexed data of the first bit rate and corresponds to the group to which the subscriber terminal in the off-hook state belongs.

3. The system according to claim 1, wherein said switch-side transmission device further includes means for deciding the number of channel units allocated to the subscriber-side transmission devices at each point in time based upon a temporal transition in traffic through each subscriber-side transmission device; and said connection controller performs connection control, on the basis of the number of channel units decided, to connect channel units and lines which send time-division multiplexed data of the first bit rate.

4. A switch-side transmission device connected through digital signal transmission device connected through digital signal transmission lines to subscriber-side transmission devices, each provided in remote areas, for converting analog signals from subscriber terminals divided into a plurality of groups to digital signals, time-division multiplexing the digital signals on a per-group basis to obtain time-division multiplexed data having a first bit rate, further time-division multiplexing the time-division multiplexed data of each group to obtain time-division multiplexed data having a second bit rate, and sending the time-division multiplexed data having the second bit rate to the digital signal transmission lines, comprising:

demultiplexing means for demultiplexing the time-division multiplexed data of the second bit rate sent from each subscriber-side transmission device via a digital signal transmission line to time-division multiplexed data of the first bit rate of each respective group;

channel units for inputting the time-division multiplexed data of the first bit rate to a switch and the number of which being smaller then a total number of groups of all subscriber-side transmission devices;

a connecting circuit for connecting, to a prescribed channel unit, a line which sends the demultiplexed time-division multiplexed data of the first bit rate; and a connection controller for discriminating off-hook states of subscriber terminals in each group based upon subscriber terminals on-hook/off-hook state information sent from each subscriber-side transmission device, and controlling said connecting circuit to connect, to an unused channel unit, a line corresponding to a group to which a subscriber terminal in the off-hook state belongs.

5. A switch-side transmission device connected through digital signal transmission lines to subscriber-side transmission devices, each provided in remote areas, for converting analog signals from subscriber terminals divided into a plurality of groups to digital signals, time-division multiplexing the digital signals on a per-group basis to obtain time-division multiplexed data having a first bit rate, further time-division multiplexing the time-division multiplexed data of each group to obtain time-division multiplexed data of each second bit rate, and sending the time-division multiplexed data having the second bit rate to the digital signal-transmission lines, comprising:

demultiplexing means for demultiplexing the time-division multiplexed data of the second bit rate sent from each subscriber-side transmission device via a digital signal transmission line to time-division multiplexed data of the first bit rate of each respective group;

channel units for inputting the time-division multiplexed data of the first bit rate to a switch and the number of which being smaller than the total number of groups of all subscriber-side transmission devices;

a connecting circuit for connecting, to a prescribed channel unit, a line which sends the demultiplexed time-division multiplexed data of the first bit rate;

means for obtaining a temporal transition in traffic through each subscriber-side transmission device, and deciding the number of channel units allocated to the subscriber-side transmission devices at each point in time based upon the temporal transition in traffic; and a connection controller for controlling said connecting circuit, on the basis of the number of channel units decided, to connect channel units and lines which send the time-division multiplexed data of the first bit rate.

* * * * *